US007695238B2

(12) United States Patent
Heath

(10) Patent No.: US 7,695,238 B2
(45) Date of Patent: Apr. 13, 2010

(54) CENTER-OF-MASS LIFT MECHANISM

(75) Inventor: Jonathan C. Heath, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 583 days.

(21) Appl. No.: 11/264,491

(22) Filed: Oct. 31, 2005

(65) Prior Publication Data

US 2007/0098535 A1 May 3, 2007

(51) Int. Cl.
*B65G 47/22* (2006.01)
*B65F 1/00* (2006.01)
*B23Q 3/18* (2006.01)

(52) U.S. Cl. ........................ 414/754; 414/546; 414/458; 414/420; 414/743; 414/403; 269/58; 269/19; 269/71

(58) Field of Classification Search .................. 269/19, 269/58, 71; 414/546, 678, 754, 758, 783
See application file for complete search history.

(56) References Cited

U.S. PATENT DOCUMENTS 2,099,998 A * 11/1937 Berg .......................... 414/546
2,463,102 A * 3/1949 Gruetjen ...................... 73/456
2,467,187 A * 4/1949 Capper ........................ 40/613
3,320,795 A * 5/1967 Hessler et al. ............. 73/65.01
3,930,643 A * 1/1976 Moore ......................... 269/58
4,058,229 A * 11/1977 Triplett ...................... 414/546
4,091,946 A * 5/1978 Kraeft et al. ................ 414/501
4,294,440 A * 10/1981 Severt ......................... 269/71
5,081,865 A * 1/1992 Schechter et al. .......... 73/65.07
5,488,861 A * 2/1996 McConnell et al. ........... 73/462

* cited by examiner

*Primary Examiner*—Gregory W Adams
(74) *Attorney, Agent, or Firm*—Tung & Associates

(57) ABSTRACT

A lift mechanism includes a balance structure configured to hold an object, wherein the balance structure is rotateably connected to an arm structure at a pivot point. The pivot point is configured, and the object is positioned, such that the pivot point is substantially coincident with the center-of-mass of the object being moved. Weights may be selectively attached to the balance structure to adjust the center-of-mass. In one embodiment, the lift mechanism includes a base and an arm configured to rotate with respect to the base, wherein the arm is attached to the balance structure at the pivot point. In this way, heavy objects may be lifted, translated, and rotated into place safely in an efficient manner.

17 Claims, 3 Drawing Sheets

CENTER-OF-MASS LIFT MECHANISM

STATEMENT REGARDING FEDERALLY SPONSORED RESEARCH

This invention was made with Government support under Contract No. DAAH23-00-C-0001. The Government has certain rights in this invention.

TECHNICAL FIELD

The present invention generally relates to lift mechanisms, and more particularly relates to a lift mechanism incorporating a center-of-mass balance.

BACKGROUND

During the maintenance and assembly of large machinery (e.g., aircraft and the like), it is often necessary to move, lift, and rotate relatively heavy objects in order to place them in the correct position and orientation with respect to other components. In general, with reference to FIG. 1, an object 102 having a center-of-mass 106 must be moved from a position 110(*a*) to a position 110(*b*) such that it can be attached to a mating component 104. This repositioning generally requires a combination of lifting, translating, and rotating the object, which may be accomplished in any number of steps and in any number of ways. Various types of lift mechanisms are traditionally used for this purpose, including, for example, transmission jacks, trunnions, and other such devices.

Prior art lift mechanisms are unsatisfactory in a number of respects. For example, as it is often necessary to rotate the object into place, there is a risk that the object will pivot into an undesirable position, causing danger to the object as well as the individuals operating the mechanism. The object's center-of-mass may fall outside the base of the lift mechanism, for example, leading to tipping of the entire assembly.

Furthermore, prior art devices generally require three or four operators to move and hold the object in place, leading to inefficiencies during operation. Likewise, such devices are typically very large, and thus cannot be effectively used in tight spaces.

Accordingly, there is a need for a lift mechanism that is both safe and efficient, requiring a minimum number of individuals to operate, and allowing for a wide range of motion in a confined space.

BRIEF SUMMARY

A lift mechanism in accordance with the present invention includes a balance structure configured to hold an object, wherein the balance structure is rotateably connected to an arm structure at a pivot point. The pivot point is configured, and the object is positioned, such that the pivot point is substantially coincident with the center-of-mass of the object being moved. In one embodiment, the lift mechanism includes a base and an arm configured to rotate with respect to the base, wherein the arm is attached to the balance structure at the pivot point. In this way, heavy objects may be lifted, translated, and rotated into place safely in an efficient manner.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In general, a lift mechanism in accordance with the present invention allows for positioning of an object such that the object pivots around an axis extending through its center-of-mass (or center-of-gravity), and at the same time may be tilted upward and translated sideways to achieve the correct position and orientation.

Figure 1:
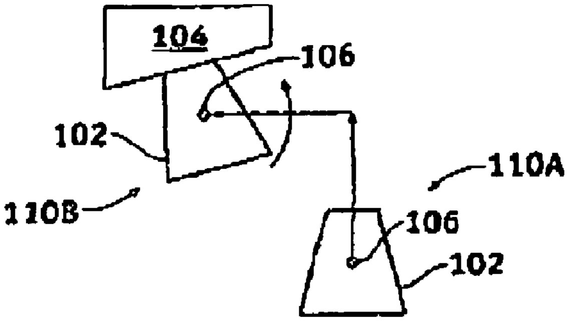
FIG. 1 depicts the movement of an object in a manner useful for understanding the present invention.
Figure 2:
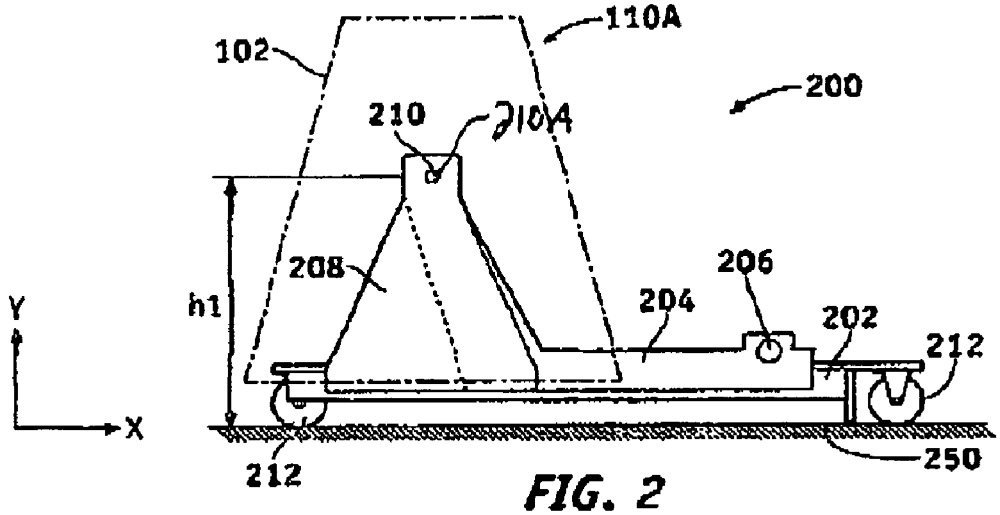
FIG. 2 is a schematic side view of a lift mechanism in accordance with one embodiment of the present invention.

Referring to FIG. 2, a lift mechanism in accordance with one embodiment of the present invention comprises a base 202, one or more rolling components 212, an arm 204 rotateably connected to base 202 via a pivot 206, and a center-of-mass balancer (or simply "balancer") 208 rotateably coupled to arm 204 via a pivot 210. As shown, an object 102 seats within, is affixed to, or is otherwise connected to balance 208 such that its center-of-mass 210A (as projected on the x-y plane shown in the side view) substantially coincides with pivot 210. Stated another way, rotation of balancer 208 occurs around an axis passing through pivot 210, and the center-of-mass of the object 210A lies substantially along this axis. In this way, when balance 208 is rotated, the center-of-mass of object 102 remains in a known location with respect to the structure.

Figure 3:
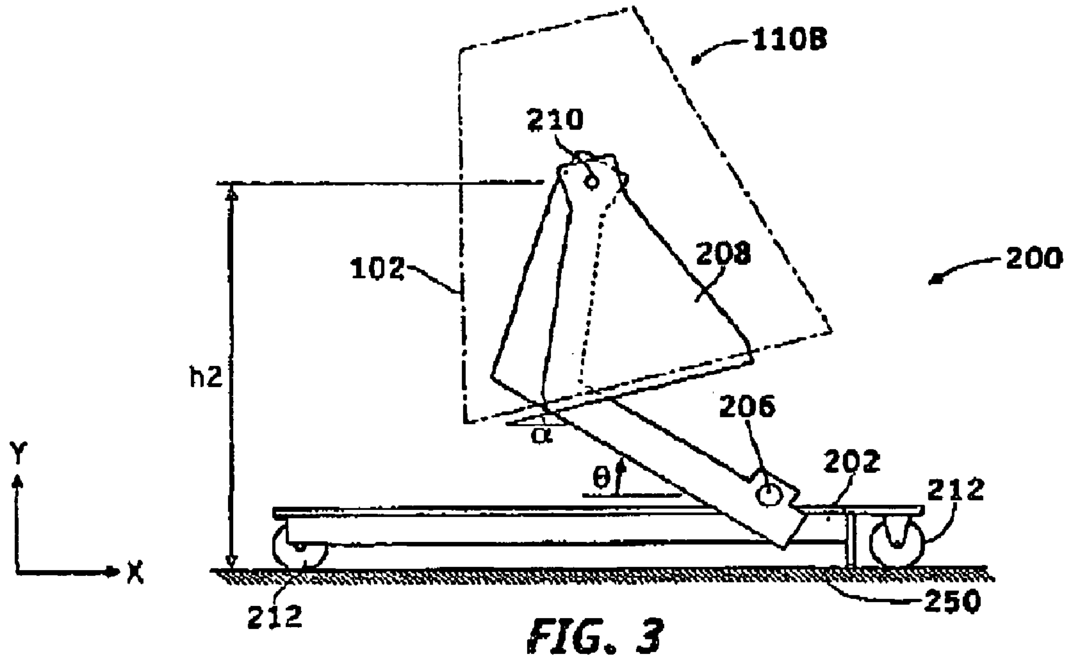
FIG. 3 is a schematic side view of the lift mechanism of FIG. 2 during movement of the object.

As shown in FIG. 3, the components of lift mechanism 200 may be articulated to move object 102 from a first position and orientation 110(*a*) to a second position and orientation 110(*b*). Generally, base 202, arm 204, and balance 208 are suitably moved to accomplish this task.

Rolling components 212 allow base 202 to be translated laterally with respect to the ground (or "reference surface") 250, and may comprise any rolling device now known or later developed, including various wheels, castors, and the like. More broadly, rolling components 212 may include any device allowing lateral movement of base 202 with respect to ground 250.

Arm 204 is rotated with respect to base 202 through an angle $\theta$ such that pivot 210 is raised from a height $h_1$ (in FIG. 2) to a height $h_2$ (in FIG. 3). Movement of arm 204 may be effectuated through any convenient method, including pneumatics, gears, pulleys, or any other such mechanical actuation. Similarly, arm 204 may be held in place using a variety of mechanical techniques known in the art.

Balance 208 is rotated an angle $\alpha$ with respect to arm 204 around pivot 210 in order to orient object 102 for interfacing with the mating component. As mentioned above, it is desirable to position object 102 such that its center-of-mass coincides with pivot 210. This may be accomplished a variety of convenient fixturing techniques. As with arm 204, movement of balance 208 may be effectuated through any convenient method of mechanical actuation. Balance 208 may likewise be held in place with respect to arm 204 using a variety of mechanical techniques known in the art. In one embodiment, a clamping arrangement is used in connection with an axle extending outward from the pivot point, wherein the clamp contacts the outer diameter of the axel and is thereby held in place.

Figure 4:
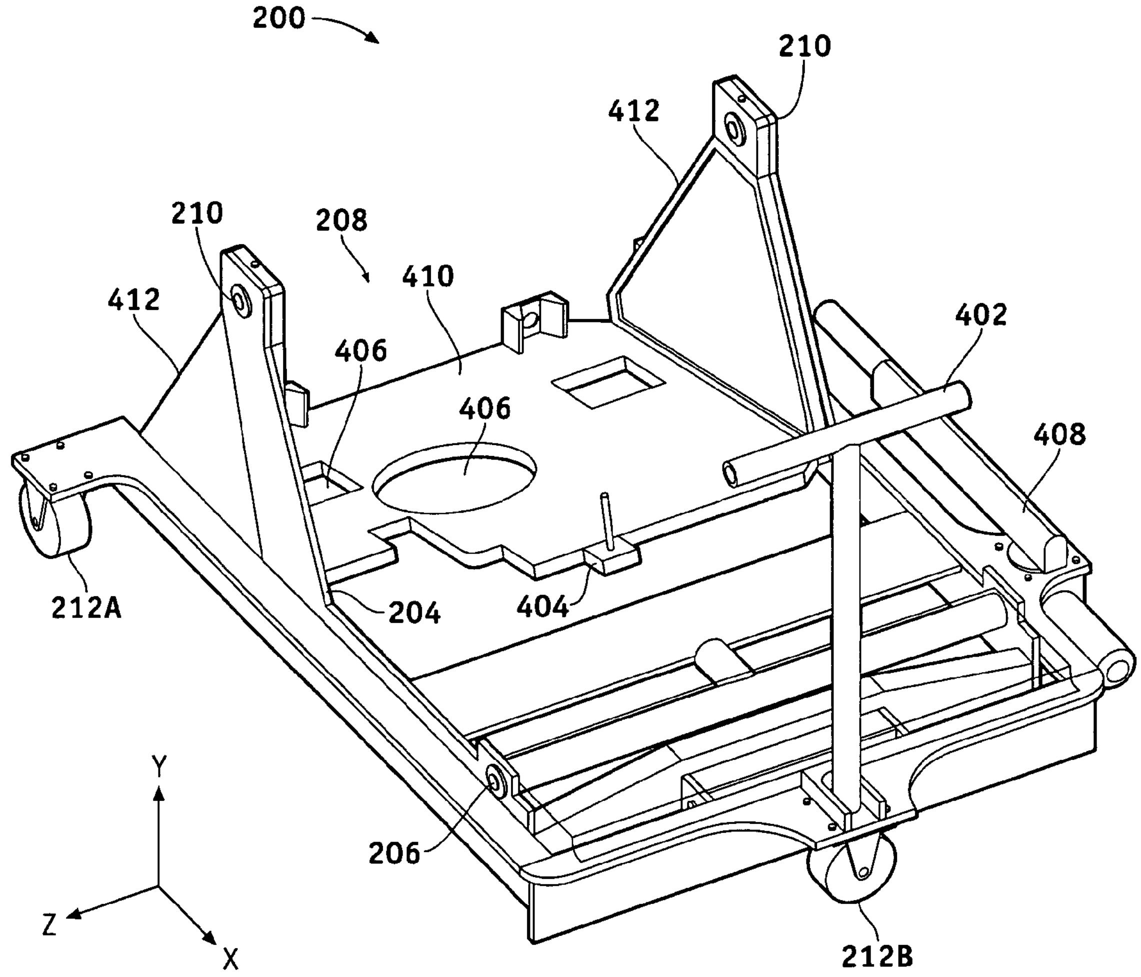
FIG. 4 is an isometric overview of a lift mechanism in accordance with one embodiment of the present invention.

FIG. 4 shows a particular embodiment of the present invention. Lift mechanism 200 includes three casters 212 situated in a triangular pattern and attached to base 202, which generally has a "U"-shape. In one embodiment, base 202 comprises 6.0×4.0×3/8 steel angle structures, although any other suitable material, shape, or dimensions may be used.

Casters 212(*a*), 212(*b*), and 212(*c*) (not shown) are fixed with respect to base 202. Thus, lateral movement of the device is accomplished by applying force to base 202 and/or a steering device 402. Steering device 402 may be fixed with respect to base 202 or coupled to one or more of casters 212 to effectuate rotation/translation of the entire unit.

An arm actuator 408 is used to rotate arm 204 about a pivot 206. In the illustrated embodiment, arm actuator comprises a pneumatic jack device, although any other suitable mechanism might be used. Arms 408 may comprise any convenient material, for example, steel or other sufficiently strong material, depending upon the particular application and desired load. Pivot 206 may comprise, for example, two needle bearings with mating shafts, or any other sufficiently strong pivoting structure.

Balance 208 comprises two generally triangular side arms 412 rigidly coupled to a balance base 410. Balance base 410, in this embodiment, includes one or more openings 406 that allow subcomponents to be cleared, inserted or removed from the object during assembly. A securing mechanism 404 (e.g., a bolt, clamp, or the like) is used to rigidly connect the object to balance base 410 during operation. In the illustrated embodiment, the object may be rotated 360° with respect to base 202 without the center-of-mass of the object extending outside base 202. In one embodiment, balance base 410 may be rotated plus or minus 360° without the center-of-mass of the object extending outside the balance base itself (i.e., as viewed from above mechanism 200).

Figure 5:
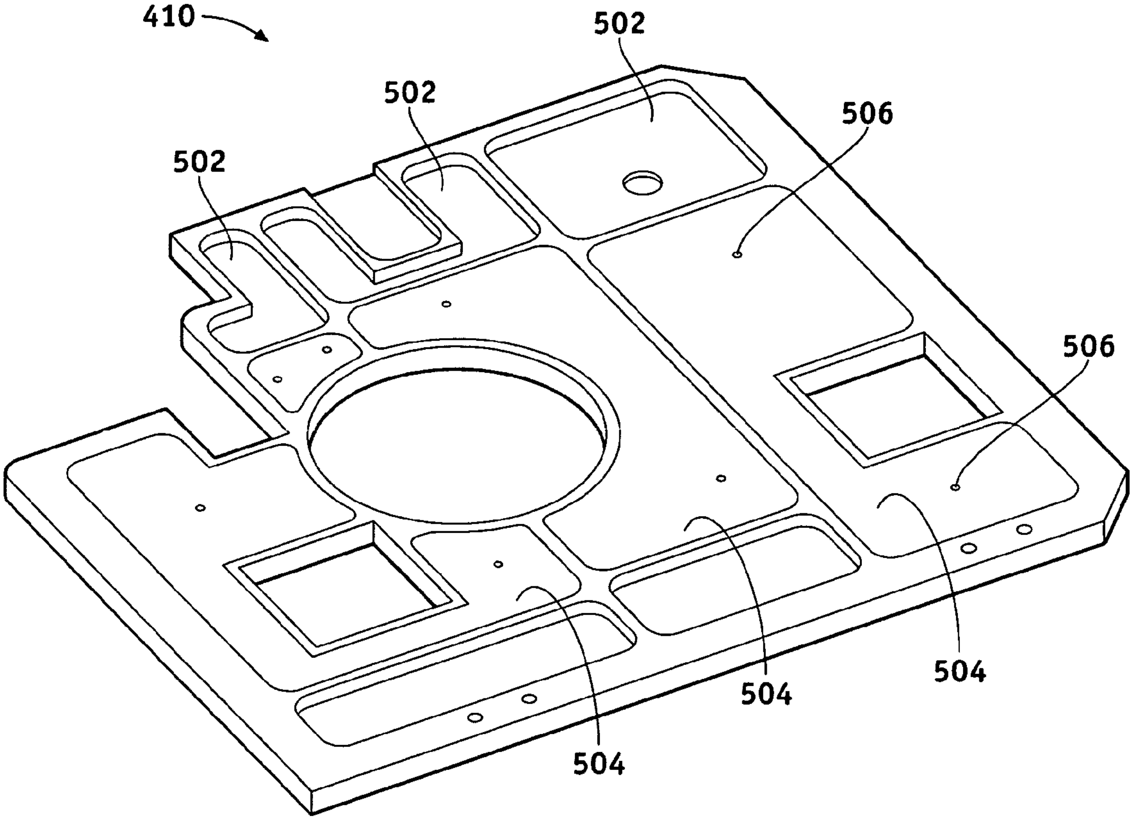
FIG. 5 is an isometric overview of the underside of an exemplary balance base.

In accordance with another aspect of the invention, weights may be selectively added to the balance structure to adjust the center-of-mass of the balance structure/object system. More particularly, referring to FIG. 5, the underside of balance base 410 may include any number of indentations configured to receive weight inserts 504. By placing a series of weights within balance base 410, the effective center-of-mass of the system may be lowered—e.g., lowered such that the weight-distribution of top-heavy objects can be counteracted to align the effective center-of-gravity with the pivot point of the balance structure. Selecting the position and magnitude of any such weights may be accomplished in any number of ways. For example, the weights may be selected manually using trial and error to determine whether the object is properly balanced. Alternatively, the object may be modeled using any suitable modeling software, allowing the center-of-mass to be determined computationally.

As shown, balance 208, arm 204, and base 202 are moved individually or in concert in a way that is safe and efficient, requiring only one individual for operation. By configuring object 110 so that it rotates substantially around its center of mass, the lift operates safely and is not likely to tip or cause other dangerous situations.

While at least one exemplary embodiment has been presented in the foregoing detailed description, it should be appreciated that a vast number of variations exist. For example, movement of the various components in the illustrated embodiment is performed manually; however, computer control and/or automatic control systems may be incorporated. Furthermore, the dimensions and scale of the illustrated embodiment are not intended to be limiting. In addition, while the present invention is illustrated as rotating within a plane, the invention may be implemented to articulate and rotate along a third axis.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A lift mechanism of the type used to move an object relative to a reference surface, wherein the object has a center-of-mass, the lift mechanism comprising:

an arm structure rotateably attached to a base, said arm structure configured to laterally move with respect to the reference surface, wherein the arm structure comprises a first portion extending from a second portion at a substantially oblique angle, the second portion rotateably attached to the base;

a balance structure configured to hold the object, wherein the balance structure is rotateably connected to the arm structure at a single pivot point on said balance structure, and said pivot point is substantially coincident with the center-of-mass of the object wherein said balance structure comprises one or more selectively removable weights, wherein adding or subtracting one or more weights to the balance structure aligns the center-of-mass of the object together with the balance structure to be substantially coincident with said pivot point; and wherein said balance structure is rotatable with respect to said arm structure to orient said object from a first angle of orientation to a second angle of orientation with respect to said reference surface wherein said rotation of the balance structure with respect to the arm structure occurs around an axis passing through said center-of-mass and wherein said arm structure and said balance structure are disposed within said base such that said balance structure is rotatable with respect to said arm such that said center-of-mass does not extend outside said base.

2. The lift mechanism of claim 1 wherein said base includes one or more rolling components configured to allow said base to move laterally with respect to the reference surface.

3. The lift mechanism of claim 2, further including a steering mechanism coupled to said base.

4. The lift mechanism of claim 1, further including a hydraulic actuator configured to rotate said arm structure with respect to said base.

5. The lift mechanism of claim 1, wherein said balance structure includes an access opening.

6. The lift mechanism of claim 1, wherein said balance structure may be clamped in place with respect to said arm to hold said second angle of orientation.

7. A lift mechanism of the type used to move an object relative to a horizontally disposed reference surface, wherein the object has a center-of-mass, the lift mechanism comprising:

a base;

one or more rolling components attached to said base to allow said base to move laterally with respect to said reference surface;

an arm structure rotateably attached to said base, wherein the arm structure comprises a first portion extending from a second portion at a substantially oblique angle, the second portion rotateably attached to the base;

a balance structure configured to hold the object, wherein the balance structure is rotateably connected to the arm structure at a single pivot point on said balance structure, and wherein said balance structure comprises one or more selectively removable weights, wherein adding or subtracting one or more weights to the balance structure aligns the center-of-mass of the object together with the balance structure to be substantially coincident with said pivot point; and wherein said balance structure is rotatable with respect to said arm to orient said object from a first angle of orientation to a second angle of orientation with respect to said horizontal reference surface wherein said rotation of the balance structure with respect to the arm occurs around an axis passing through said center-of-mass and wherein said arm structure and said balance structure are disposed within said base such that said balance structure is rotatable with respect to said arm such that said center-of-mass does not extend outside said base.

8. The lift mechanism of claim 7, wherein said base is generally "U"-shaped and wherein said rolling components includes three rolling components.

9. The lift mechanism of claim 7, further including a steering mechanism coupled to said base.

10. The lift mechanism of claim 7, further including a hydraulic actuator configured to rotate said arm structure with respect to said base.

11. The lift mechanism of claim 7, wherein said balance structure includes one or more access openings.

12. The lift mechanism of claim 7, wherein the balance structure may be rotated +/−360 degrees without the center-of-mass of the object extending outside said base.

13. The lift mechanism of claim 7, wherein said balance structure may be clamped in place with respect to said arm to hold said second angle of orientation.

14. A lift mechanism of the type used to move an object relative to a reference surface, wherein the object has a center-of-mass, the lift mechanism comprising:

an arm structure rotateably attached to a base, said arm structure configured to laterally move with respect to the reference surface, wherein the arm structure comprises a first portion extending from a second portion at a substantially oblique angle, the second portion rotateably attached to the base;

a balance structure configured to hold the object, wherein the balance structure is rotateably connected to the arm structure at a single pivot point on said balance structure, and said pivot point is substantially coincident with the center-of-mass of the object wherein said balance structure comprises one or more selectively removable weights, wherein adding or subtracting one or more weights to the balance structure aligns the center-of-mass of the object together with the balance structure to be substantially coincident with said pivot point; and wherein said balance structure is rotatable with respect to said arm structure to orient said object from a first angle of orientation to a second angle of orientation with respect to said reference surface wherein said rotation of the balance structure with respect to the arm structure occurs around an axis passing through said center-of-mass wherein said balance structure may be clamped in place with respect to said arm to hold said second angle of orientation and wherein said arm structure and said balance structure are disposed within said base such that said balance structure is rotatable with respect to said arm such that said center-of-mass does not extend outside said base.

15. The lift mechanism of claim 14 wherein said base includes one or more rolling components configured to allow said base to move laterally with respect to the reference surface.

16. The lift mechanism of claim 15, further including a steering mechanism coupled to said base.

17. The lift mechanism of claim 14, wherein the balance structure may be rotated +/−360 degrees without the center-of-mass of the object extending outside said base.

* * * * *